May 16, 1967
T. B. HAWKES ETAL
MACHINE AND METHOD FOR APPLYING CRASH TO
THE BINDING EDGES OF BOOKS
3,319,499
Filed Dec. 26, 1962
10 Sheets-Sheet 8
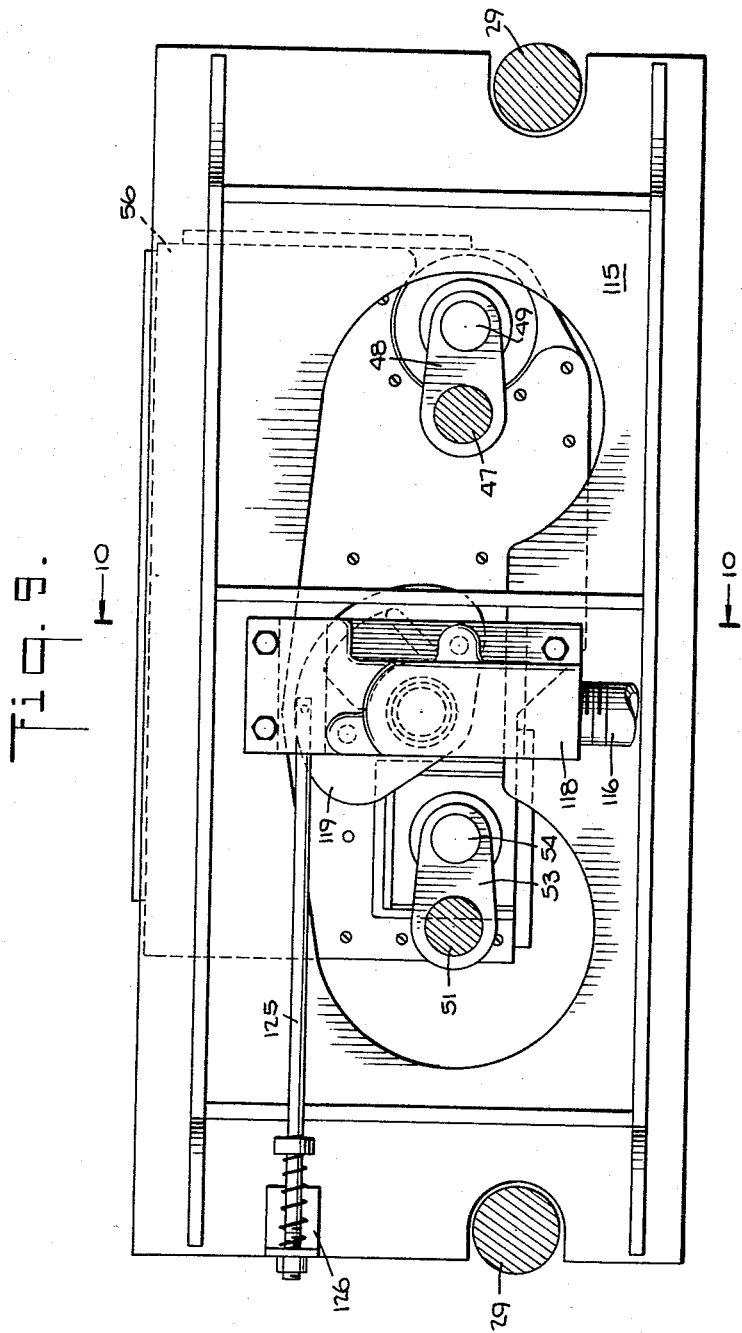
INVENTORS
THOMAS B. HAWKES
RICHARD B. HAWKES
BY
Kenyon & Kenyon
ATTORNEYS

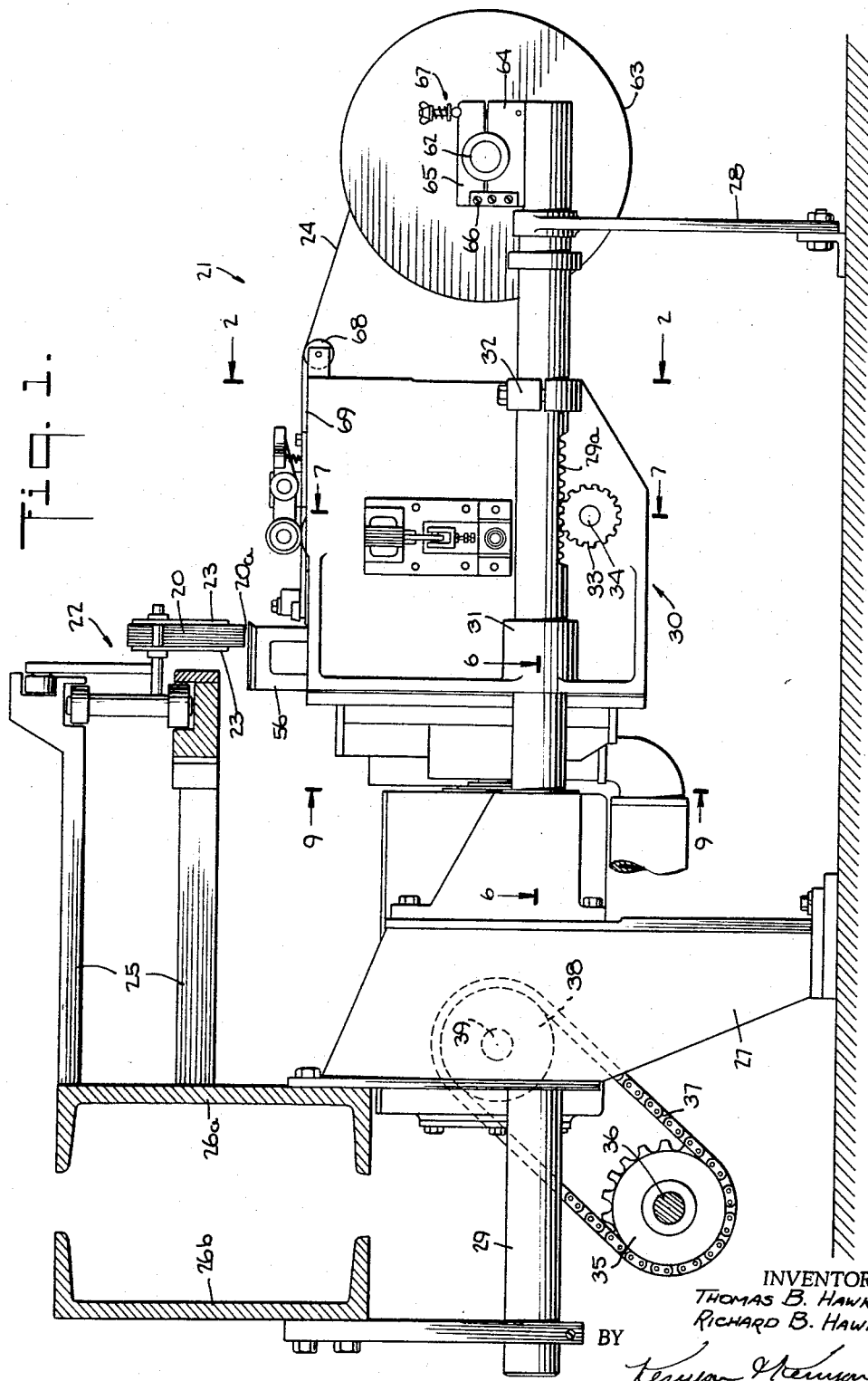

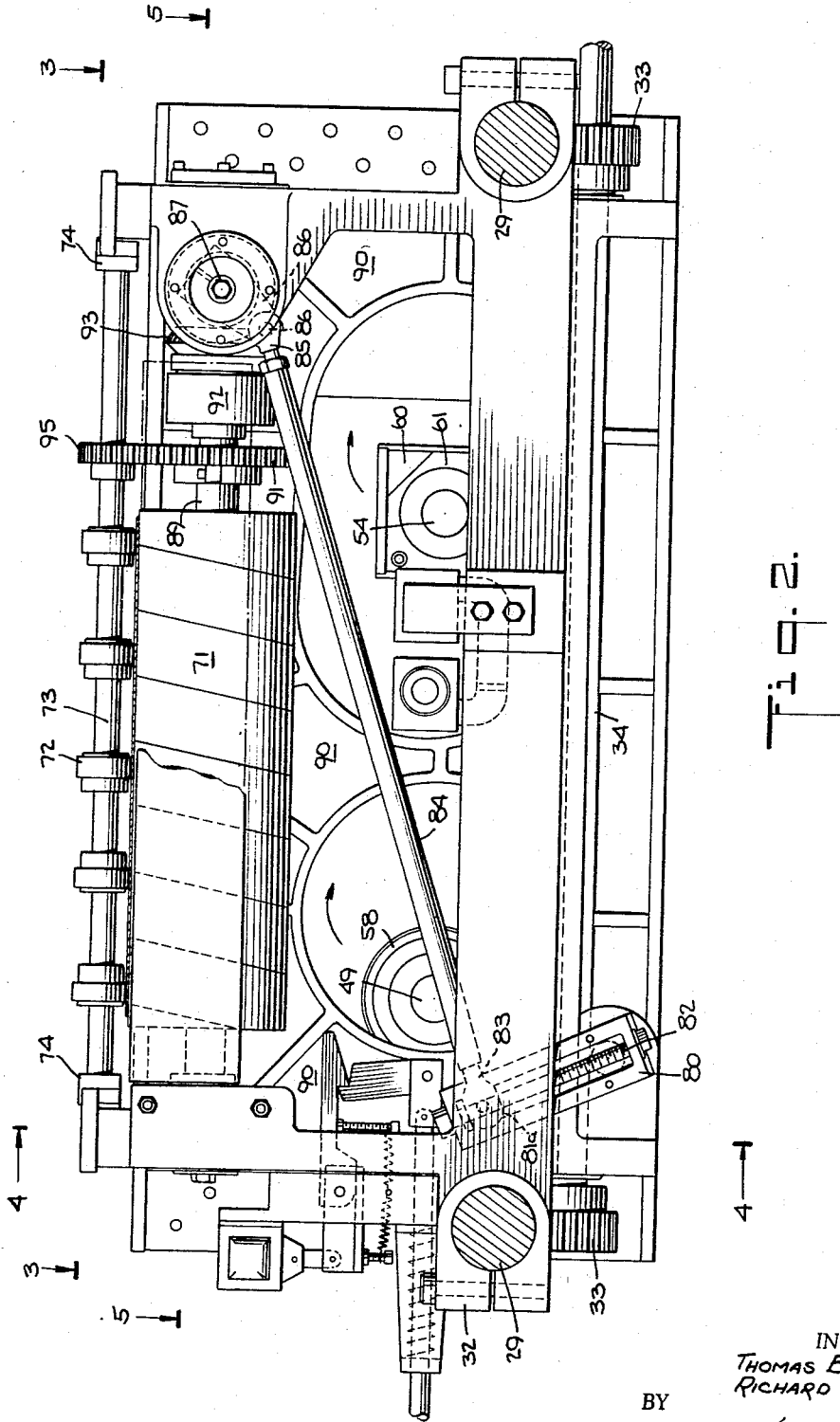

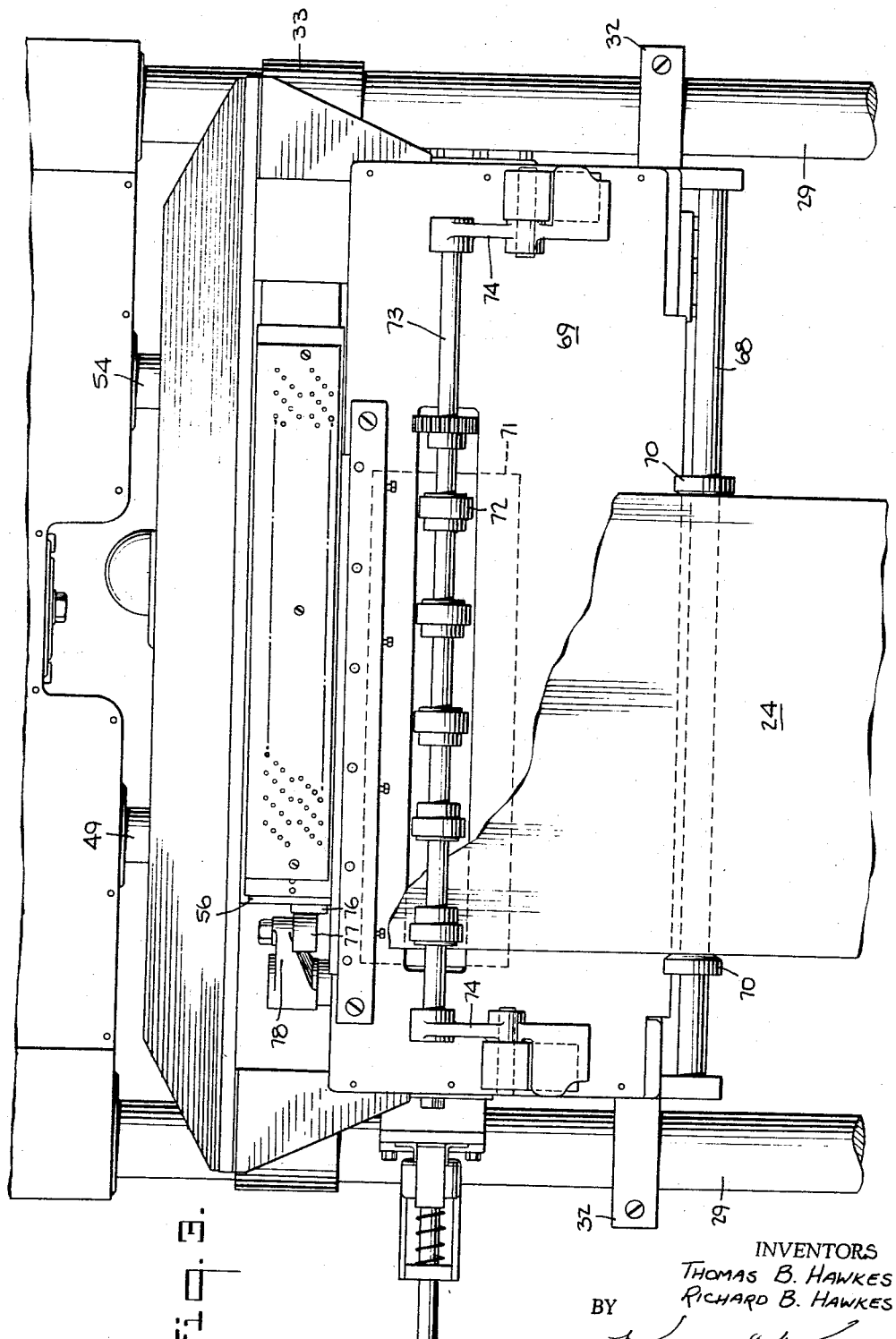

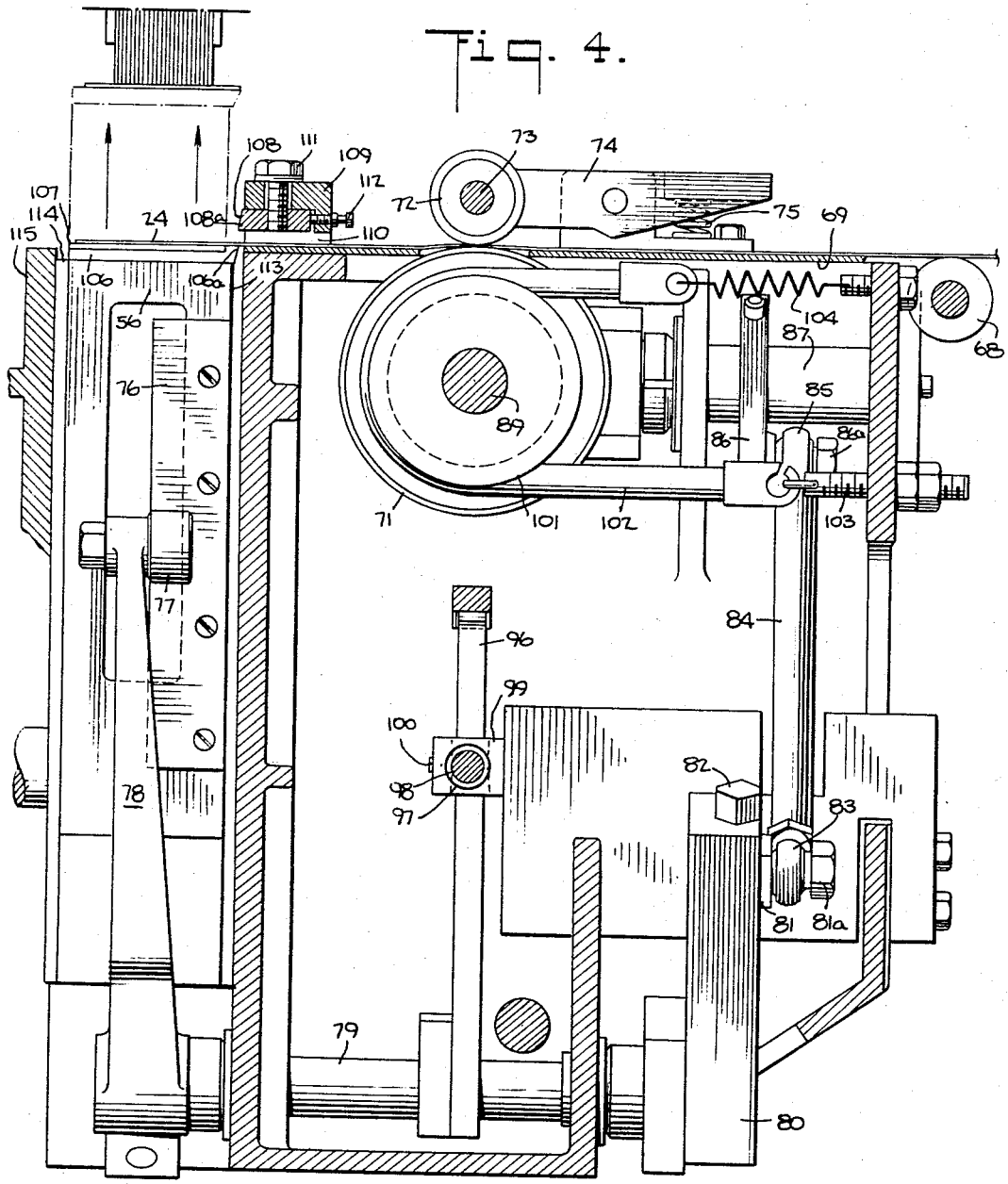

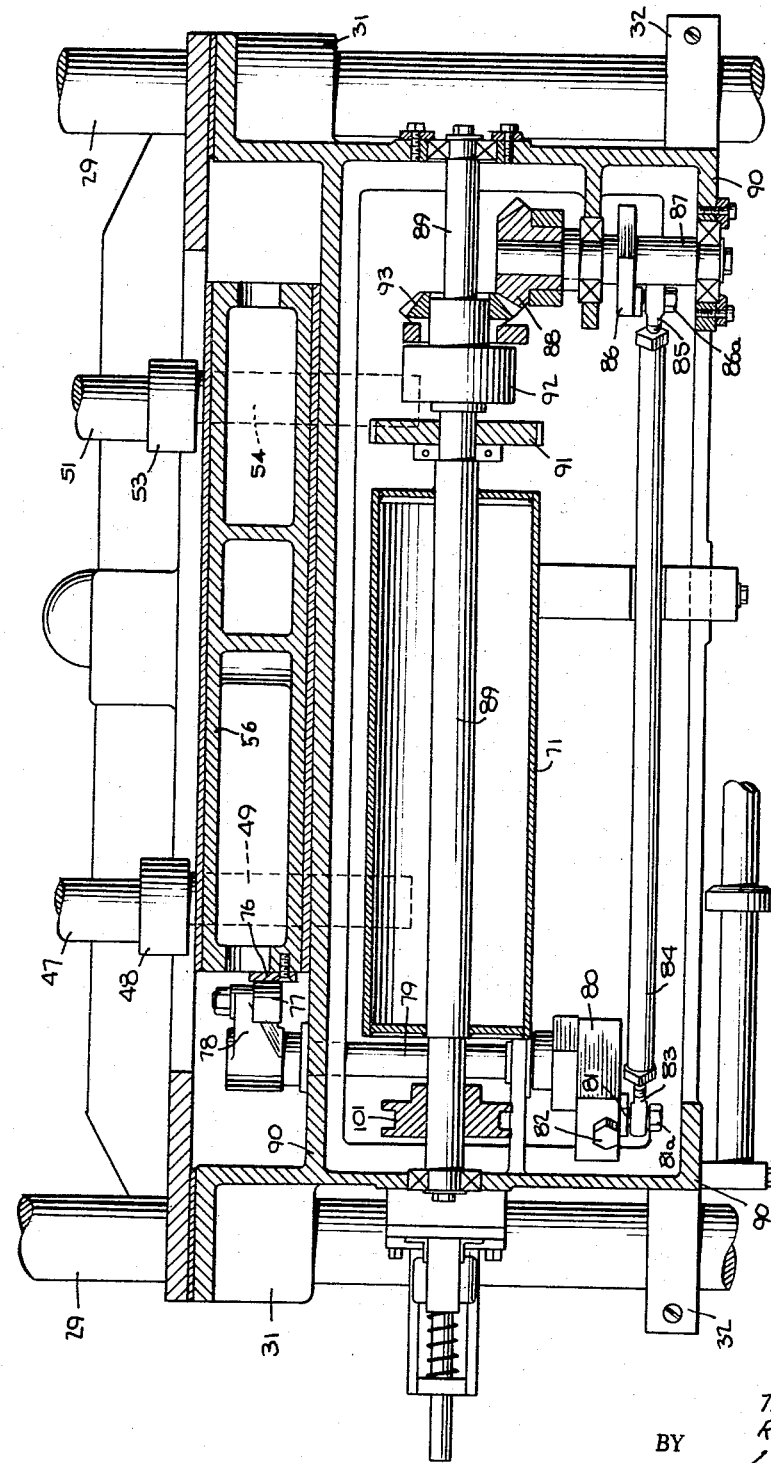

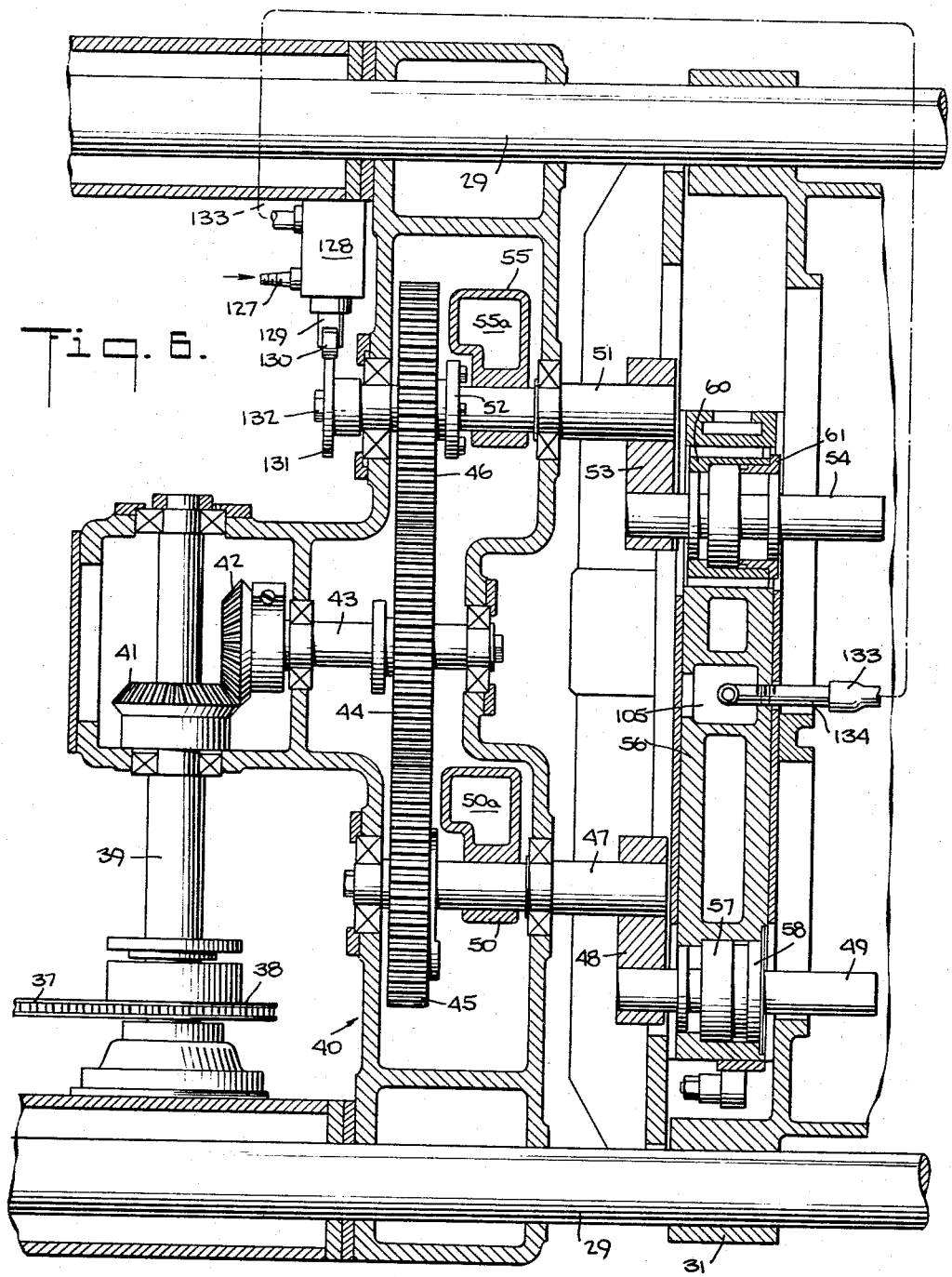

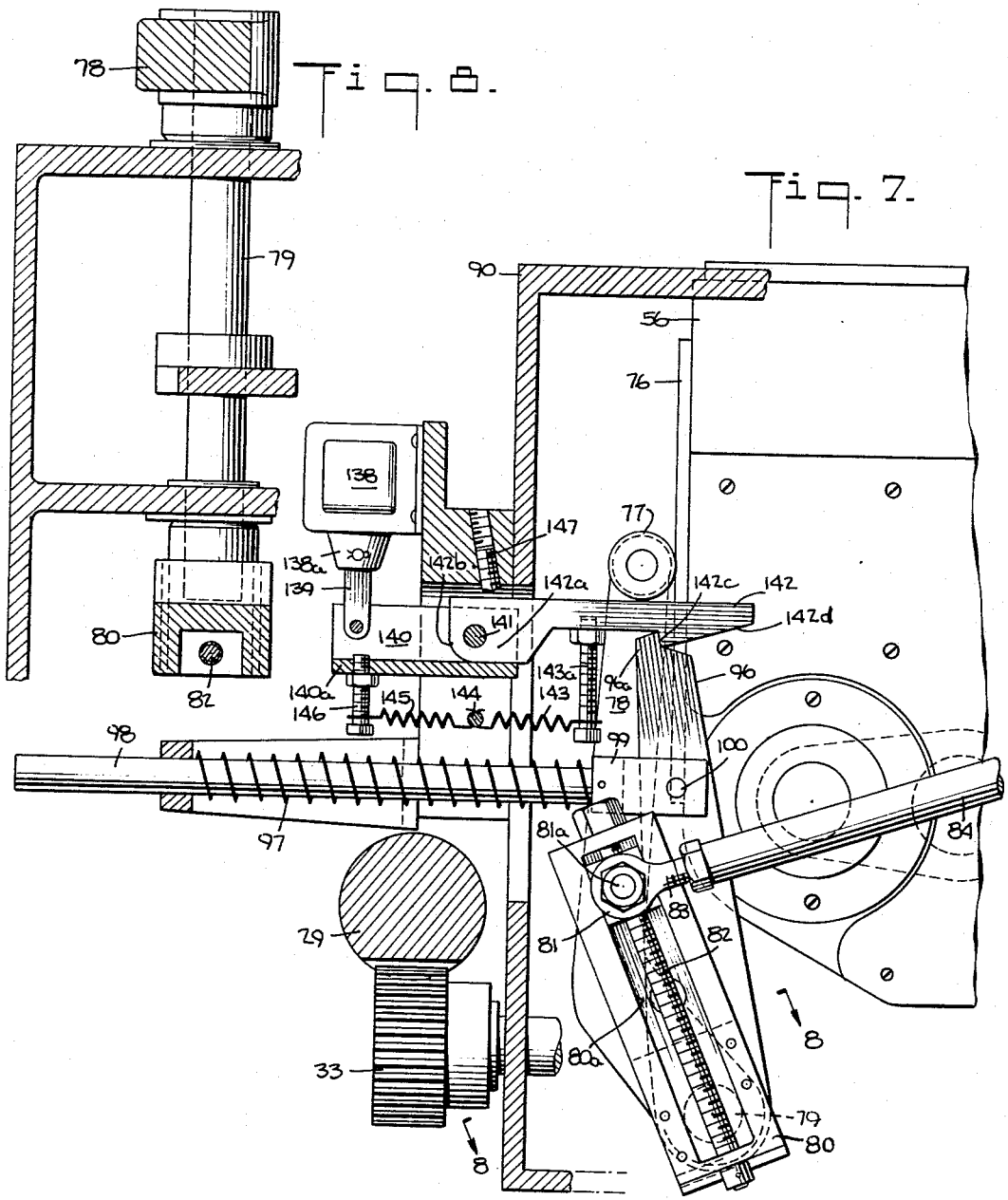

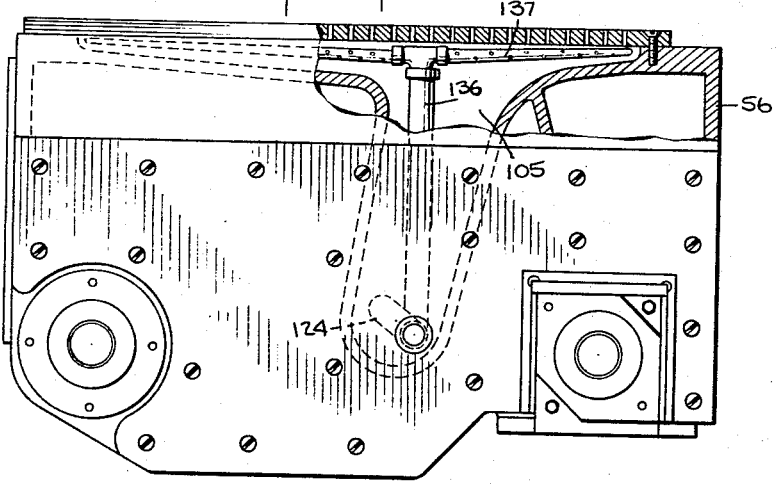
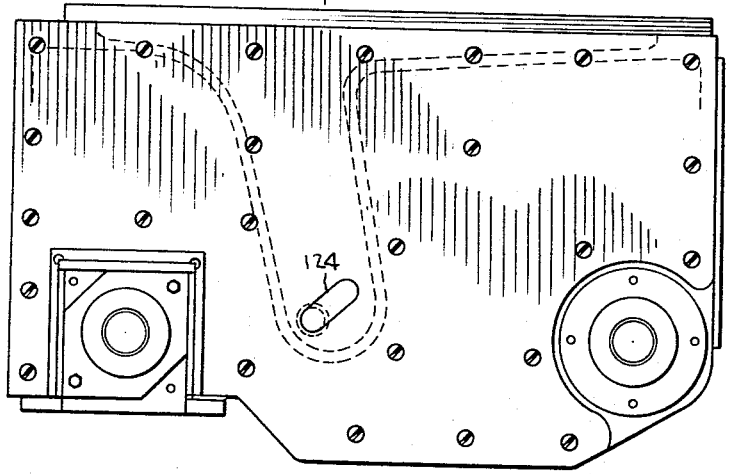
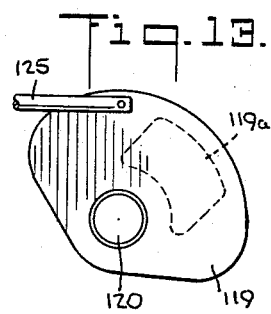
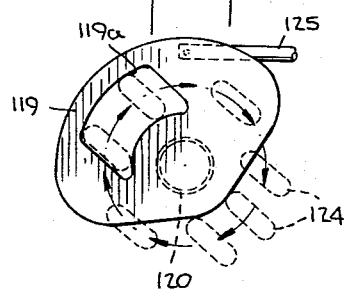

United States Patent Office 3,319,499
Patented May 16, 1967

3,319,499
MACHINE AND METHOD FOR APPLYING CRASH TO THE BINDING EDGES OF BOOKS
Thomas B. Hawkes, Manhasset, N.Y., and Richard B. Hawkes, Easton, Pa., assignors, by mesne assignments, to T. W. & C. B. Sheridan Company, a corporation of New York, a subsidiary of Harris-Intertype Corp., New York, N.Y., a corporation of Delaware
Filed Dec. 26, 1962, Ser. No. 246,936
22 Claims. (Cl. 83—99)

This invention relates to a machine for applying crash to the binding edges of books and more particularly to a machine adapted for applying crash at a comparatively high rate of speed.

In the bookbinding art, one of the common manufacturing practices begins with the gathering together of groups of signatures to form books. The books are then held between the clamps of a conveyor which advances the books adjacent to various machines used in the manufacturing process. Certain types of books contain a back strip of pervious material such as crash or other woven fabric, paper, and the like which is applied to the clamped signatures along their binding edges. When such a strip is to be employed, the binding edge of each book is first passed adjacent to a device for applying adhesive or glue. The adhesive penetrates into the crevices between the signatures or pages and thereby serves to secure the signatures or pages with respect to one another. Before the the adhesive passes through the strip material it remains plied to the binding edge after which a portion of the adhesive permeates the strip and bonds it in place. Since the adhesive passes through the strip material it remains exposed and therefore is adaptable for attaching the cover or book back to the binding edge.

In order to increase production prior art machines were provided to apply the crash to the bookbinding as the books moved with respect to the machine. In order to accomplish this the machines moved the strip of crash adjacent to and at substantially the same speed as the binding edge and then ejected the strip of crash from the supporting member of the machine toward the binding edge where the strip was retained by contacting the adhesive. In the U.S. Patent No. 2,646,104, issued July 21, 1953, the supporting member for the strip of crash is driven by a parallel linkage through a circular orbital path in order that the crash may be moved adjacent to the binding edge at substantially the same speed as the conveyor. At this point, the crash is repelled from the supporting member by a puff of compressed air with the result that the crash becomes attached to the adhesive along the binding edge.

In the machine of the patent, the supporting member for the crash is a part of an overall machine carriage which includes the supply roll for the crash and the feed mechanism for delivering the crash to the supporting member. Experience has shown that with the machine of the patent, if attempts are made to increase production beyond a certain point, the mass of the carriage must be driven at such a rate that prohibitive inertia forces and the resultant shaking loads result. Thus successful attempts to speed up the production rate of the other bookbinding machines adjacent the conveyor result in the machine for applying the crash becoming a bottleneck which limits the rate of production.

Furthermore, in a machine such as the one in the cited patent, the feed for the crash to the supporting member is actuated by an arrangement of gearing and linkage ultimately connected to the drive for the carriage. The actuation of the feed from the drive to the carriage or to the supporting member necessarily complicates the problem of synchronizing the feed to the motion of the supporting member and also of adapting the gearing and linkage to the feed for high speed operation.

In a machine such as the one in the cited patent, the movement of the entire carriage about a circular orbital path required various devices to move what would normally be a stationary knife edge with respect to the movable one mounted upon the supporting member. Such an arrangement obviously increases the inertia loads and can interfere with attempts to operate the machine at high speed.

Vacuum has been used in prior art machines to retain the strip of crash upon the supporting member after it has been cut from the supply being fed into the machine. Prior machines have also used positive air pressure to repel the strip of material from the supporting member to the binding edge of the book. In these various machines it has been common practice to connect the source of compressed air and vacuum by means of flexible hoses or sliding pipes directly to the moving supporting member. In the case of compressed air, a relatively small hose is suitable to deliver the puff of compressed air to the supporting member but with vacuum which has a relatively small differential pressure available the connections are necessarily relatively large, such as massive hoses or sliding pipes. Again it can be seen that the connection of such large devices to a moving supporting member seriously interferes with any effort to increase the speed of operation of the machine.

Another problem resulting from the use of hoses or sliding pipes connected to the moving supporting member is that they inherently increase the volume of air that must be moved in order to produce a satisfactory vacuum adjacent the strip of crash. Consequently, a longer period of time or lag occurs following actuation of the vacuum control valve before the vacuum is applied to the strip of crash. This characteristic places a limitation on speed of operation and complicates timing.

It is therefore one of the objects of the invention to provide a machine for applying crash at a high rate of speed.

It is a further object of the invention to provide a machine in which a minimum of parts are moved in order to apply the strip of crash to the bookbinding.

It is another object of the invention to provide a machine in which the knife bar supporting the strip of crash and being driven in a circular orbital path by a parallel linkage is adapted to cut the crash with respect to a stationary cutting edge.

It is still another object of the invention to provide a machine in which the arrangement for feeding the crash is actuated by a simple but carefully synchronized linkage responsive to the motions of the knife bar about its path of operation.

It is an additional object of the invention to minimize the lag between the operation of the vacuum control device and the application of vacuum to the strip of crash.

It is a further object of the invention to control the application of negative fluid pressure to the knife bar by a connection which remains stationary as the knife bar moves adjacent to it.

In one embodiment of the invention the crash supporting member or knife bar moves with respect to the means for providing or feeding the crash as the strip of crash is advanced to a position adjacent the binding edge. This is accomplished by a parallel linkage which is adapted to drive the knife bar in a circular orbital path extending to adjacent the binding edge of the book. Consequently, the supply roll of the crash and the feeding arrangement are mounted upon a carriage which remains stationary as the knife bar moves.

In a further embodiment of the invention, the knife bar which is driven in a circular orbital path and from which the strip of crash is transferred to the binding edge is adapted to cut the strip of crash as the knife bar moves with respect to a stationary blade.

In another embodiment of the invention, linkage engaged with and operated in response to the movement of the knife bar serves to actuate the means for feeding the crash.

In still another embodiment of the invention means are provided for blocking the response of the linkage for actuating the feed means to the motion of the knife bar whenever it becomes necessary to interrupt the action of the feed means.

In an additional embodiment of the invention the alignment of openings in the knife bar with a valve body connected to the negative supply of pressure serve to control the application of negative pressure to the knife bar.

In another additional embodiment of the invention, means are provided within the supporting member for distributing fluid pressure to openings therein to urge the strip of crash from the supporting member to the binding edge.

Other objects and advantages of the invention will become apparent from the following description taken in conjunction with the accompanying drawings in which:

FIG. 1 is a side elevational view of the machine for applying crash to the binding edges of books;

FIG. 2 is a vertical section view taken along the line 2—2 in FIG. 1 showing a portion of the drive to the feed roll;

FIG. 3 is a horizontal section view taken along the line 3—3 in FIG. 2 and showing the top roll adjacent the feed roll and the knife bar for supporting the strip of crash;

FIG. 4 is a vertical section view taken along the line 4—4 in FIG. 2 showing the feed roll and the extent of travel of the knife bar with respect to the binding edge of the book;

FIG. 5 is a horizontal section view taken along the line 5—5 in FIG. 2 showing the drives for the knife bar and the feed roll;

FIG. 6 is a horizontal section view taken along the line 6—6 in FIG. 1 showing the gearing connected to the knife bar drive;

FIG. 7 is a fragmentary vertical section view taken along the line 7—7 in FIG. 1 showing the catch arrangement for interrupting the feed cycle whenever there is a book missing from the clamps of the book conveyor;

FIG. 8 is a fragmentary inclined section view taken along the line 8—8 in FIG. 7 showing portions of the drive between the knife bar and the feed device;

FIG. 9 is a vertical section view taken along the line 9—9 in FIG. 1 showing the cranks for moving the knife bar through a circular orbit disposed in a vertical plane as well as the suction control valve;

FIG. 11 is a fragmentary vertical section view looking toward the front of the knife bar and showing a portion of its interior;

FIG. 12 is a rear elevational view of the knife bar showing the port for the suction control valve arrangement;

FIG. 13 is a rear elevational view of the suction control valve body showing the port arrangement; and FIG. 14 is a front elevational view of the control valve showing the relationship of the suction control valve body with respect to the valve port of the knife bar for various positions thereof.

Figure 10:
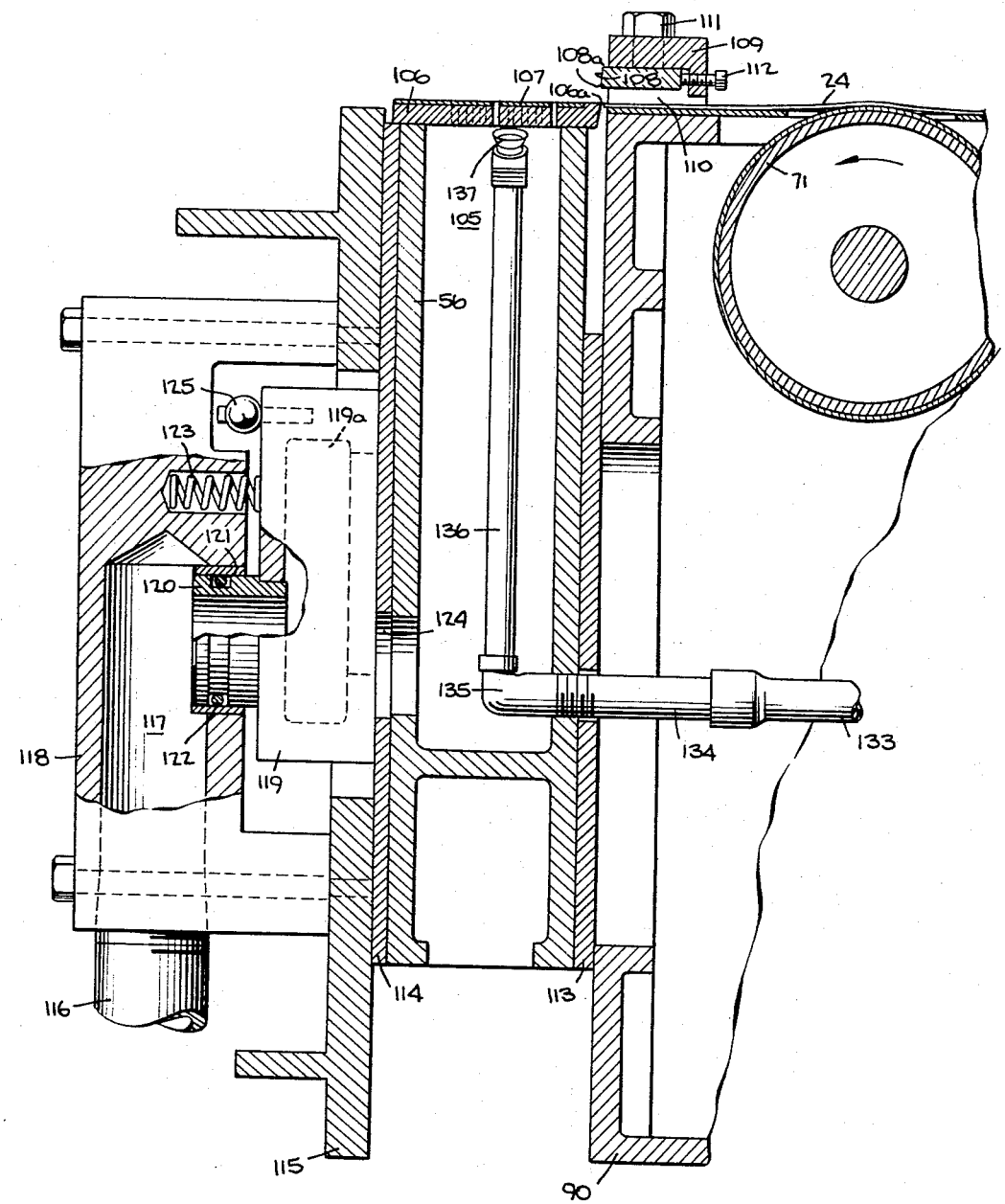
FIG. 10 is a fragmentary vertical section view taken along the line 10—10 in FIG. 9 and showing the suction valve arrangement at the knife bar.

Books 20 are conveyed with respect to crash feed machine 21 by book conveyor 22 which can be of the type shown in the United States Patent No. 2,646,104, issued July 21, 1953 (FIG. 1). On the conveyor the books are held between clamps 23 with the binding edges 20a of the books disposed in a downward position. Conveyor 22 adjacent the location in machine 21 where the strips of crash 24 are applied to the binding edges is supported by arms 25 which are attached to bracket 26a. Brackets 26a and 26b support the return run of conveyor 22.

The machine is mounted upon supports 27 and support legs 28. Horizontal supports 29 extend through supports 27 and support leg 28 (FIG. 1). Carriage 30 of the machine is adjustably mounted upon horizontal supports 29 by slides 31 and clamps 32. The position of the carriage is adjusted along the horizontal supports by means of pinions 33 engaged with racks 29a. Thus upon rotation of shaft 34 upon which the pinions are mounted, the carriage can be moved in either direction along the horizontal supports. By moving the carriage along the horizontal supports, the strip of crash to be applied to binding edge 20a can be aligned therewith regardless of the size of the book being conveyed so that the machine is adaptable for applying crash to a variety of book sizes.

The drive of machine 21 originates with drive sprocket 35 mounted upon shaft 36 which is connected to a motor or other source of power (FIG. 1). Through chain 37 drive sprocket 35 operates driven sprocket 38 mounted upon shaft 39. Gear box 40 of the machine receives its input from shaft 39 upon which is mounted bevel drive gear 41 (FIG. 6). The gevel drive gear operates bevel driven gear 42 which is mounted upon shaft 43. On shaft 43 there is also mounted spur drive gear 44 which is in mesh with spur driven gears 45 and 46.

Driven gear 45 is mounted upon shaft 47 to which is connected crank 48 having crank pin 49. To insure smoother running, shaft 47 is provided with counterweight 50 into cavity 50a of which lead is inserted to statically balance the crank and crank pin as well as the elements driven by them. Driven gear 46 is adjustably connected to shaft 51 by means of gear hub 52. As with shaft 47, shaft 51 is provided with crank 53 having crank pin 54 as well as counterweight 55 having cavity 55a.

The means for supporting the crash to be applied to the binding edge is knife bar 56 (FIGS. 3 and 6). The knife bar is moved in a substantially level position and through a circular orbital path disposed in a vertical plane by the parallel linkage formed of cranks 48 and 53 with their respective crank pins 49 and 54 engaged with the knife bar. Shaft 49 is engaged with knife bar 56 by means of bearing 57 which is mounted in the support by bearing retainer 58. In order that the arrangement operate as a parallel linkage with the knife bar substantially level at all times, it is first necessary that crank 53 be established to have the same relative angle with respect to the machine as does crank 48. This adjustment is initially made by the proper positioning of gear 46 with respect to gear 44.

The fine adjustment to maintain the parallel relative relationship of the crank is achieved by the adjustment of gear hub 52. With the cranks established in the predetermined relationship and with crank pin 49 extending through bearing 57 in the knife bar, it can be seen that the position for crank pin 54 relative to the knife bar is already determined. Consequently, bearing 59 for crank pin 54 is mounted in slide block 60 which is adapted to move in the horizontal direction during assembly and operation of the machine. The slide block is guided in position by retainer 61 (FIGS. 2 and 6).

With this arrangement, the knife bar alone is moved with the result that the power requirements for the drive are reduced, static balancing can be readily obtained, and the inertia forces are held to a low level. These advantages make truly high speed operation possible with the result that the machine for applying crash can be compatible with other machines used in the manufacture of books.

Crash 24 which is to be applied to the binding edges of the books is stored on supply roll 62 between end plates 63 (FIG. 1). Roll 62 is supported by bearing block 64 mounted upon horizontal supports 29. Each of the bearing blocks is provided with brake 65 which is connected thereto by pivot 66. The brake is adjustably set by spring-loaded toggle bolt with respect to the roll so that the proper tension is maintained in the crash extending from the supply roll.

From the supply roll crash 24 is advanced over fixed shaft 68 and onto platform 69 (FIGS. 3 and 4). Guides 70 retain the crash laterally with respect to bar or shaft 68. The crash then extends towards the means for providing the crash to the knife bar which includes feed roll 71 and top rolls 72 which are adjacent to the feed roll. The force necessary to feed the crash is developed by the engagement of the feed roll and top rolls with the crash which extends therebetween. To insure that there is no slippage of the crash, top rolls 72 are pivotally mounted on shaft 73 which in turn is held at each end by pivotal supports 74. In order that the top rolls may act as pressure rolls, the supports are biased by springs 75 which urge the rolls against feed roll 71. A further provision to insure that there is satisfactory engagement of the feed roll with the crash is that of covering the feed roll with a rough material such as grit cloth which is helically wrapped about the circumference of the feed roll. The top rolls can be provided with neoprene rubber surfaces in order that they can press the crash against the feed roll without damaging its surface or the crash.

The means for providing or feeding the crash in response to the movement of the knife bar orginates at cam plate 76 mounted along the end portion of the knife bar (FIG. 4). The lateral movement of the blade support during its cycle of operation is transmitted by the cam plate to roller follower 77 mounted upon rocker arm 78. Rocker arm shaft 79 transmits the motion due to the cam action to adjustable feed crank 80 (FIGS. 5 and 7). The adjustable crank contains slot 80a in which is disposed feed crank slide block 81. Feed crank adjusting screw 82 extends through the slot and engages the slide block in order to enable the block to be moved to a predetermined position within the slot.

The adjustable feed crank is connected by pivot 81a of the slide block to adjustable rod end 83 of push rod 84. At the opposite end of the push rod adjustable rod end 85 is connected to feed crank 86 by pivot 86a. (FIGS. 2 and 5. Feed crank 86 is adjustably clamped to shaft 87 to which is attached bevel feed drive gear 88. Feed roll shaft 89 mounted in main frame 90 at each end thereof is connected to top roll drive gear 91 and overrunning clutch 92. In turn the clutch is connected to bevel feed drive gear 93. Overrunning clutch 92 which can be of the sprag type, the roller clutch type, or the like, is adapted to engage shaft 89 in a manner such that the clutch can transmit the drive from the bevel gears to the feed roll in the direction to feed crash 24 disposed above the feed roll.

Top roll shaft 73 is driven by the engagement of top roll driven gear 95 with gear 91. It is desirable that the crash be driven between the top rolls and the feed rolls without any slipping and therefore the rolls are operated with substantially the same surface speed. This condition can be obtained by selecting gears 91 and 95 to have pitch diameters substantially equivalent to the diameters of the rolls adjacent thereto.

The means for blocking the response of the means for actuating the feeding means includes catch lever 96 rigidly attached to shaft 79 which is biased in a clockwise direction as seen in FIG. 7. The biasing force is exerted by spring 97 disposed about rod 98 which is coupled to yoke 99. Pivot 100 connects the yoke to the catch lever. The clockwise biasing of the catch lever as seen in FIG. 7 by means of spring 97 also serves to bias roller follower 77 against cam plate 76 of the blade support. As shown in FIG. 2 the movement of the books above the machine is from left to right. Thus as viewed in FIG. 2 shafts 49 and 54 rotate in a clockwise circle as indicated by the arrows and consequently the position shown in the drawing is that in which knife bar 56 is at its extreme left position. As shown in FIG. 7 the engagement of the blade support with the follower 77 causes rocker arm 78 to rotate in a counterclockwise direction whenver knife bar 56 is moving to the left. Consequently when the knife bar begins its return motion to the right, rocker arm 78 rotates in a clockwise direction. Of course during the movement from the extreme lefthand position as viewed in FIG. 2, the knife bar begins to rise at the same time it moves toward the right.

It therefore can be seen that in FIG. 2 adjustable feed crank 80 has been rotated in the counterclockwise direction and thus push rod 84 has moved feed crank 86 in a clockwise direction. In turn the movement of the feed crank is transmitted to shaft 87 and through the bevel gears and overrunning clutch to the feed roll which then rotates in a manner to advance the crash toward the blade support.

Shaft 89 is provided with pulley 101 about which is engaged friction cord 102 of leather or the like which is retained to the main frame by anchor 103 at one end and spring 104 at the other end thereof (FIGS. 4 and 5). Adjustment of the anchor enables the friction cord to be preloaded about the pulley and the spring maintains the preload condition. During the feed motion of feed roll 71 which is in the counterclockwise direction as viewed in FIG. 4, the frictional forces on cord 102 serve to additionally load spring 104 in tension. At the termination of the movement of adjustable feed crank 80 in a counterclockwise direction as viewed in FIG. 7, the feeding motion of feed roll 71 ends and crank 80 begins to move in a clockwise direction as viewed in FIG. 7, whereupon a reversal in torque takes place at overrunning clutch 92. With the loss of torque in shaft 87, spring 104 returns to its normal preloaded condition thereby applying a clockwise torque to pulley 101. The application of the clockwise torque to the pulley is transmitted by shaft 87 to overrunning clutch 92 and facilitates the disengaging of the clutch so that feed roll 71 is not inadvertently rotated in a direction opposite to a normal feed direction during the time that crank 80 moves in a clockwise direction as viewed in FIG. 7. In this way it is insured that the feed roll can only drive in the feeding direction and is immediately disengaged when the push rod attempts to reverse the motion of the feed drive.

Knife bar 56 contains cavity 105 underlying lower knife 106 and valve plate 107 (FIGS. 10 and 11). The valve plate and lower knife arrangement can be similar to that shown in the U.S. patent cited herein. Cutting edge 106a of the lower knife travels in a vertical plane which is substantially tangential to cutting edge 108a of stationary knife 108. Stationary knife 108 is supported by bracket 109 above platform 69 thereby forming clearance 110 through which the crash can pass. The stationary blade is held by screws 111 extending through the bracket and is positioned with respect to lower knife 106 by screws 112.

Knife bar 56 is provided with front wear plate 113 which engages main frame 90 and rear wear plate 114 which engages backway plate 115 (FIG. 10). After the feed of the crash over the knife bar the upward motion of the knife bar cuts the crash between cutting edges 106a and 108a and then the knife bar carries the strip of crash toward the binding edge of the book above. Suction within cavity 105 is employed to hold the crash securely on the knife bar during the time it is elevated to adjacent the binding edge for application thereto. Hose 116 is connected to a source of negative fluid pressure such as that produced by a blower or pump. In this way the negative pressure is connected to passage 117 in valve bracket 118. Cavity 119a of valve body 119 is provided with tube 120 which slides within sleeve 121 in the valve bracket and is sealed therein by O-ring 122. Spring 123 urges valve body 119 against backway plate 114 through which extends slot 124 into knife bar 56. Valve body 119 is pivotally mounted by means of tube 120 and is provided with control rod 125 (FIGS. 9, 10 and 13). The end of the control rod opposite the valve body is adjustably secured in bracket 126.

Since knife bar 56 is driven by the parallel linkage including cranks 48 and 53, slot 124 in communication with cavity 105 moves in a circular path (FIG. 14). Cavity 119a of the valve body overlies the path of travel of slots 124 and thereby places the negative pressure within hose 116 into communication with cavity 105 whenever cavity 119a is aligned with slots 124. The radial position of valve body 119 as determined by the setting of adjusting rod 125 determines the point in the orbital cycle of the knife bar at which the negative pressure is applied to cavity 105. Thus to adjust the machine the valve body is positioned so that the negative pressure is applied to the knife bar after the crash has been fed to it. The circumferential length of cavity 119a then determines the duration of the application of negative pressure to the knife bar. This circumferential length is selected to maintain the negative pressure during the upward travel of the knife bar until the crash overlying it is brought to a position adjacent the binding edge of the book above.

In order to eject the crash from the knife bar to the binding edge of a book, an air blast is directed through the openings in the knife bar and against the crash thereon. A source of positive fluid pressure such as a compressed air supply is connected to pipe 127 extending from valve 128 which is operated by plunger 129 (FIG. 6). The plunger is actuated by the motion resulting from the engagement of roller follower 130 on the plunger with cam 131 which is adjustably mounted on shaft 51 by screw 132. With this arrangement the actuation of valve 128 can be timed to the motion of the knife bar since the knife bar is driven by the crank arrangement connected to shaft 151 upon which the cam is mounted. Hose 133 shown in part by a dash line in FIG. 6 connects valve 128 to pipe 134 which is mounted in communication with cavity 105 in knife bar 56. The provision of hose 133 serves as the flexible connection for the air supply to the moving knife bar (FIG. 10).

Elbow 135 and pipe 136 disposed within the knife bar continued the air passage to manifold 137 extending beneath the openings in lower knife 106. The manifold containing a plurality of openings 137a serves as the means for distributing the positive pressure toward the crash since it directs the flow of air toward the openings in the lower knife. Thus it can be seen that the minimum quantity of compressed air can be projected as a puff of air through the lower knife and valve plate openings and against the crash in response to the actuation of valve 128. Without the pipe and manifold arrangement within the cavity of the knife bar it would be necessary to fill the entire cavity with pressured air before a satisfactory puff could be effected. Furthermore, the use of compressed air enables the relatively small passages to transmit sufficient air to develop a satisfactory puff, while the larger passages such as those of the cavity of the knife bar and those of the valve body are desirable where mere negative pressure is to be utilized.

In operation of the machine, the possibility arises that a book is missing from between clamps 23 of conveyor 22. In such a case when the empty clamps arrive at the station overlying the knife bar, it is unnecessary and undesirable to deliver the crash to the empty clamps. In accordance with the U.S. patent cited herein, means are employed to detect the absence of a book in advance of the arrival of the clamps at the station overlying the knife bar.

As shown in FIG. 7 knife bar 56 moves along the lower portion of its circular orbit and to the left as seen in the drawing during the feed of the crash onto the knife bar. Thus the engagement of cam plate 76 with roller follower 77 rotates rocker arm 78 in a counterclockwise direction during the feed of the crash. If the feed is to be interrupted because of the absence of a book between the clamps of the conveyor, rocker arm 78 must be prevented from moving in a clockwise direction to a position where the next feed motion begins. Therefore the missing book detector arrangement set forth in the cited patent must be positioned with respect to the conveyor in order that it can give an output signal during the feed of the crash for the book in advance of the clamps which are lacking a book.

Armature 138a of solenoid 138 extends downwardly when the solenoid is in its normal deenergized condition. Catch link 139 connects the armature to catch strip 140 which is pivotally mounted with respect to catch pin 141 extending from the machine main frame. Catch strip 140 which has an angle section includes support 140a which extends beneath base portion 142a of catch 142 pivotally mounted with respect to catch pin 141. As shown in FIG. 7 when catch 142 is moved in a clockwise direction, base portion 142a becomes rigidly engaged with support 140a. On the other hand with movement of catch 142 in a counterclockwise direction, radius 142b of the catch enables the catch to move freely with respect to support 140a. Spring 143 extending from anchor 144 to screw 143a is adapted to bias catch 142 in a clockwise direction as shown in FIG. 7. Spring 145 which is also connected to anchor 144 and screw 146 biases catch strip 140 in a counterclockwise direction as shown in FIG. 7. The tension of the springs is selected to insure that spring 145 applies sufficient force to move catch trip 140 downwardly in a counterclockwise direction to a point where support 140a engages base portion 142a thereby raising catch 142 in a counterclockwise direction. Stop screw 147 is positioned to engage the upper surface of catch 142 when shoulder 142c of the catch clears the path of motion of the uppermost portion of lug 96a of catch lever 96. As long as the catch is maintained in the elevated position, catch lever 96 is free to oscillate and therefore rocker arm 78 is free to follow the motion of the knife bar.

The missing book detector of the type similar to that shown in the cited patent is adapted to sense the missing book during the feed of the crash to the book in advance of the missing one. The detection of the missing book results in the actuation of solenoid 138 in which the armature and catch link 139 are moved upwardly thereby moving catch trip 140 upwardly. The engagement of support 140a of the catch trip with base portion 142a of the catch causes the catch to be moved downwardly in a clockwise direction as seen in FIG. 7. During the feed of the crash to the book in advance of the missing one, catch lever 96 rotates in a counterclockwise direction. As the catch lever approaches the lowered catch, lug 96a encounters sloping surfaces 142d and slides along it thereby elevating the catch against the bias of spring 143. At the end of the feed stroke lug 96a passes beyond shoulder 142c at which point the bias of spring 143 snaps the catch downwardly so that the catch lever is held in a fixed position.

Following the completion of the feed portion of the cycle of the book in advance of the missing one the knife bar begins to move to the right as seen in FIG. 7. With the catch engaged to the catch lever, it can be seen that the catch lever and therefore the rocker arm are prevented from entering upon their return motion as the knife bar moves to the right. Thus the feed linkage remains deactivated as long as the catch engages the catch lever. In setting up the machine the linkage is adjusted in order that the knife bar moves the rocker arm and thereby the catch lever to a position where the catch lever can be locked by the catch prior to the extreme left movement of the knife bar as seen in FIG. 7. Following the passage of the missing book and the approach of a pair of clamps having a book disposed therebetween, the missing book detector deenergizes solenoid 138 so that only the frictional engagement of lug 96a with shoulder 142c secures the catch to the catch lever. However, as the knife bar moves in the left direction as seen in FIG. 7, through the lower portion of its orbit which would normally be effecting a feed of crash, the knife bar engages the rocker arm toward the left end extreme portion of the travel and rotates the rocker arm in a counterclockwise direction sufficiently to unload the engagement between the lug and the shoulder of the catch. The result of this is that the spring bias forces urge the catch upwardly in a counterclockwise direction and prevent its subsequent engagement with the catch lever. With this arrangement it can be seen that the driving of the feed from the knife bar greatly simplifies the linkage, insures that the feed can be accurately synchronized with the movement of the knife bar, and lends itself to an effective locking arrangement which enables the feed to be conveniently interrupted whenever a book is missing from between the clamps.

Operation

In preparing the machine for applying crash to the binding edges of the books, the positioning of the books is adjusted with respect to clamps 23 of conveyor 22 in order that the binding edge is approximately 1/16" or more above the top surface of valve plate 107. In order to insure that the crash after being cut by the lower and stationary knives is in alignment with and fits the binding edge, pinion 33 is rotated to slide carriage 30 with respect to horizontal supports 29. The positioning of the carriage therefore determines the path of travel of the cutting edge of the lower knife 106a as seen in FIG. 1 so that the lower knife is in a predetermined location with respect to the binding edge when the lower knife is elevated to adjacent the binding edge. In this way the edge portion of the strip of crash can be applied adjacent evenly with the binding edge or can extend beyond the binding edge.

The length of crash fed for each cycle of the machine and thereby the width of the strip of crash which is applied to the binding edge of the book is determined by the adjustment of slide block 81 with respect to feed crank 80. Thus by rotation of adjusting screw 82, the radial position of adjustable rod end 83 is determined with respect to the axis of rotation of rocker arm shaft 79 and thereby length of the path of motion of the push rod. Adjustable rod ends 83 and 85 can be set following changes of the slide block position to insure that the push rod can link the slide block to feed crank 86 in the extreme positions without binding.

To insure that the horizontal velocity of the knife bar is substantially that of the conveyor at the uppermost position of the knife bar in its circular orbital path, the drive of the knife bar originating at shaft 36 is synchronized with the drive for the conveyor. Consequently, once machine and the conveyor are synchronized it is insured that the binding edge is properly aligned over the knife bar when it is at the highest point in its circular path and that the drive of the machine to the knife bar can be conditioned to provide the knife bar with the same horizontal velocity as that of the binding edge.

In order to further prepare the machine for operation, a source of negative pressure is connected to hose 116 and then by means of adjusting rod 125, valve body 119 is positioned to cause cavity 119a to overlie slot 124 of the knife bar for the portion of the cycle during which the negative pressure is to be applied to the crash disposed above valve plate 107. Therefore the valve body can be set to apply the negative pressure to the knife bar immediately following the feeding of the crash onto the knife bar and subsequently to terminating the negative pressure as the knife bar enters upon the uppermost portion of its circular path of travel.

The ejecting of the crash from the knife bar by a puff or blast of compressed air is timed for cycle by positioning cam 131 with respect to shaft 51 by means of adjusting screw 132. The contour of the cam determines the duration of the period during which the cam opens valve 128 thereby applying the compressed air to the manifold within the knife bar.

To insure that the puff of air is directed along the center line of the strip of crash which is disposed beneath the center line of the binding edge of the book above, valve plate 107 is moved laterally with respect to lower knife 106 in order that only the openings which are disposed beneath the center line of the crash transmit the puff of air upwardly. This arrangement and adjustment is similar to that set forth in the U.S. patent cited herein.

As a book carried by conveyor 22 approaches from the left as seen in FIG. 7 to a position overlying the uppermost position of the knife bar, the knife bar moves through the lower portion of its circular path toward the left as viewed in FIG. 7. The engagement of cam plate 76 with roller follower 77 of rocker arm 78 actuates adjustable feed crank 80 and push rod 84 connected to feed crank 86. By means of bevel gears 88 and 93 and overrunning clutch 92, feed roll 71 and top rolls 72 are rotated to feed the crash disposed therebetween toward the knife bar. As the knife bar begins to return from its left extreme position and enter upon the upper portion of its circular path, slots 124 move into registry with cavity 119a of valve body 119 thereby applying negative pressure to hold the crash upon the knife bar as it is cut from the crash adjacent the stationary blade. The parallel linkage continues to move the knife bar upwardly and toward the right as viewed in FIG. 7 and when the knife bar is substantially at its uppermost position adjacent the binding edge of the book above, slots 124 pass out of registry with cavity 119a so that the application of negative pressure to the cavity of the knife bar is terminated. At this point cam 131 actuates valve 128 which applies compressed air to manifold 137 in order to eject the strip of crash from the knife bar onto the binding edge of the book. After applying the puff of air cam 131 is advanced to a point where it no longer actuates valve 128 and therefore the application of compressed air to the manifold is terminated.

The parallel linkage then continues to move the knife bar to the right and downwardly as viewed in FIG. 7 until it reaches its right extreme position. Previously when the knife bar began to move from its left extreme position, the reversal of motion of rocker arm 78 is transmitted through the push rod and bevel gears to overrunning clutch 92. Friction cord 102 tended to reverse feed roll 71 at this point due to the bias of spring 104 and thus facilitated the disengagement of overrunning clutch 92. Consequently, during the movement of the knife bar to the right as viewed in FIG. 7, the motion transmitted to the bevel gears was isolated from the feed roll and thus the feed roll remained stationary holding the crash in a readied state for the next feed operation. After reaching the extreme right hand position as viewed in FIG. 7, the knife bar begins to return to the left and downwardly at which time the next feed operation of the crash takes place.

Whenever a book is missing from between the pair of clamps on the conveyor, this condition is sensed by a detector of the type shown in the U.S. patent cited herein during the feed stroke for the book preceding the location of the missing book. The detector actuates solenoid 138 which then raises catch trip 140 thereby lowering the outer end of catch 142. Toward the latter portion of the travel to the left of the knife bar as viewed in FIG. 7, lug 96a of the catch lever contacts sloping portion 142d of the catch and subsequently passes beyond shoulder 142c at which point the catch lever is restrained from motion to the right. Consequently, when the knife bar moves upwardly and to the right, there is no return motion by rocker arm 78 and thus the drive to feed roll 71 is not conditioned for a feed cycle.

The catch lever remains locked by the catch until the solenoid is deenergized and the knife bar returns toward its left hand extreme position. There the engagement of cam plate 76 with roller follower 77 unloads the engagement of the lug to the catch and enables springs 143 and 145 to urge catch 142 upwardly to its normal rest position.

What is claimed:

1. A machine for applying a strip of material to the binding edge of a book adjacent thereto comprising means for supporting the strip in a substantially flat form, means for providing the strip on said supporting means, means for moving said supporting means with respect to said providing means through an orbit extending to adjacent the binding edge, and means for urging the strip by fluid pressure from said supporting means to the binding edge.

2. A machine for applying a strip of material to the binding edge of a book adjacent thereto comprising means for supporting the strip, means for providing the strip on said supporting means in a substantially flat form, means for retaining the strip by fluid pressure on said supporting means, means for moving said supporting means with respect to said providing means through an orbit extending to adjacent the binding edge, and means for urging the strip by fluid pressure from said supporting means to the binding edge.

3. A machine for applying a strip of material to the binding edge of a book adjacent thereto comprising means for supporting the strip, means for feeding the strip material to said supporting means, means for moving said supporting means with respect to said feeding means along a path extending to adjacent the binding edge, means for cutting the strip material on said supporting means into a strip including a stationary cutting member and a moving cutting member operable therewith and mounted on said supporting means, and means for urging the strip by fluid pressure from said supporting means to the binding edge.

4. A machine for applying a strip of material to the binding edge of a book moving adjacent thereto comprising means for supporting the strip in a substantially flat form, means for providing the strip on said supporting means, means for moving said supporting means with respect to said providing means along a path extending to adjacent the binding edge, the velocity of said moving means adjacent the binding edge being substantially equal and parallel to the velocity of the book, and means for urging the strip by fluid pressure from said supporting means to the binding edge.

5. A machine for applying a strip of material to the binding edge of a book moving adjacent thereto comprising means for supporting the strip in a substantially flat form, means for providing the strip on said supporting means, means for retaining the strip by fluid pressure on said supporting means, means for moving said supporting means with respect to said providing means along a path extending to adjacent the binding edge, the velocity of said moving means adjacent the binding edge being substantially equal and parallel to the velocity of the book, and means for urging the strip by fluid pressure from said supporting means to the binding edge.

6. A machine for applying a strip of material to the binding edge of a book moving adjacent thereto comprising a stationary frame, means for supporting the strip, means for feeding the strip material to said supporting means, means for moving said supporting means with respect to said feeding means along a path extending to adjacent the binding edge, the velocity of said moving means adjacent the binding edge being substantially equal and parallel to the velocity of the book, means mounted on said frame means and said supporting means for cutting the material on said supporting means into a strip by the movement of said supporting means, and means for urging the strip by fluid pressure from said supporting means to the binding edge.

7. A machine for applying a strip of material to the binding edge of a book moving adjacent thereto comprising a stationary frame, means for supporting the strip, means for feeding the strip material to said supporting means, means for moving said supporting means with respect to said feeding means along a path extending to adjacent the binding edge, the velocity of said moving means adjacent the binding edge being substantially equal and parallel to the velocity of the book, means for retaining the strip by fluid pressure on said supporting means, means mounted on said frame means and said supporting means for cutting the material on said supporting means into a strip by the movement of said supporting means, and means for urging the strip by fluid pressure from said support means to the binding edge.

8. A machine for applying a strip of material to the binding edge of a book moving adjacent thereto comprising means for supporting the strip, means for feeding the strip material to said supporting means, means for moving said supporting means with respect to said feeding means along a path extending to adjacent the binding edge, the velocity of said moving means adjacent the binding edge being substantially equal and parallel to the velocity of the book, means for cutting the material on said supporting means into a strip including a stationary cutting member and a moving cutting member operable therewith mounted on said supporting means, and means for urging the strip by fluid pressure from said supporting means to the binding edge.

9. A machine for applying a strip of material to the binding edge of a book moving adjacent thereto comprising means for supporting the strip, means for providing the strip on said supporting means, means for moving said supporting means with respect to said providing means along a path extending to adjacent the binding edge, the velocity of said moving means adjacent the binding edge being substantially equal and parallel to the velocity of the book, means for urging the strip by fluid pressure from said supporting means to the binding edge, and means for positioning the path of motion of said supporting means into alignment with the binding edge when adjacent thereto.

10. A machine for applying a strip of material to the binding edge of a book adjacent thereto comprising means for supporting the strip, means for moving said supporting means with respect to said providing means through an orbit extending to adjacent the binding edge, means for providing the strip of material on said supporting means in response to the movement of said supporting means, and means for urging the strip from said supporting means to the binding edge.

11. A machine for applying a strip of material to the binding edge of a book adjacent thereto comprising a stationary frame, means for supporting the strip, one portion of said supporting means having an opening therein, another portion of said supporting means having another opening therein, means for providing the strip material to said one portion of said supporting means, means for moving said supporting means relative to said providing means and through an orbit extending to adjacent the binding edge, and means mounted on said stationary frame for forming a fluid connection to said other opening during a portion of the orbit of said supporting means, whereby negative pressure can be cyclically connected to the opening of said one portion of said supporting means.

12. A machine for applying a strip of material to the binding edge of a book adjacent thereto comprising a stationary frame, means for supporting one portion of said supporting means having an opening therein, another portion of said supporting means having another opening therein, means for providing the strip material to said one portion of said supporting means, means for moving said supporting means relative to said providing means and through an orbit extending to adjacent the binding edge, and means pivotally mounted on said stationary frame for forming a fluid connection to said other opening during a portion of the orbit of said supporting means, whereby negative pressure can be connected to the opening of said one portion of said supporting means for a predetermined portion of its circular orbit.

13. A machine for applying a strip of material to the binding edge of a book adjacent thereto comprising a stationary frame, means for supporting the strip having one portion containing a first opening and additional portions containing second and third openings, said second openings being in communication with said first opening, means for providing a strip of material to said supporting means, means for moving said supporting means relative to said providing means and through an orbit extending to adjacent the binding edge, means mounted on said frame adjacent the path of travel of said second opening for applying negative pressure thereto to hold the strip on said one portion of said supporting means, and means for applying positive pressure to said third opening to urge the strip from said one portion of said supporting member to the binding edge.

14. A machine for applying a strip of material to the binding edge of a book adjacent thereto comprising a stationary frame, means for supporting the strip having one portion containing an opening and an additional portion containing an additional opening in communication with said opening, means for providing a strip of material to said supporting means, means for moving said supporting means relative to said providing means and to adjacent the binding edge, means for applying fluid pressure to said additional opening, and means connected to said additional opening for distributing fluid pressure adjacent said opening within said supporting member to urge the strip from said one portion of said supporting member to the binding edge.

15. A machine for applying a strip of material to the binding edge of a book adjacent thereto comprising a stationary frame, means for supporting the strip, means mounted stationary with respect to said stationary frame for feeding the strip material to said supporting means, means for moving said supporting means with respect to said stationary frame and along a path extending adjacent to the line of feed of the strip material and to adjacent the binding edge, cutting means mounted stationary on said stationary frame and cooperating cutting means mounted stationary with respect to said supporting means for cutting the material on said supporting means into a strip by the movement of said supporting means with respect to said stationary frame, and means for urging the strip by fluid pressure from said supporting means to the binding edge.

16. A machine for applying a strip of material to the binding edge of a book adjacent thereto comprising a stationary frame, means for supporting the strip, means mounted stationary with respect to said stationary frame for feeding the strip material to said supporting means, means for retaining the strip by fluid pressure on said supporting means, means for moving said supporting means with respect to said stationary frame and along a path extending adjacent to the line of feed of the strip material and to adjacent the binding edge, cutting means mounted stationary on said frame and cooperating cutting means mounted stationary with respect to said supporting means for cutting the material on said supporting means into a strip by the movement of said supporting means with respect to said stationary frame, and means for urging the strip by fluid pressure from said supporting means to the binding edge.

17. A machine for applying a strip of material to the binding edge of a book comprising means for supporting the strip, means for feeding the strip material to said supporting means, means for moving said supporting means relative to said feeding means and through an orbit extending to adjacent the binding edge, cam means for actuating said feeding means in response to the motion of said supporting means, and means for urging the strip from said supporting means to the binding edge.

18. A machine for applying a strip of material to the binding edge of a book comprising means for supporting the strip, means for feeding the strip material to said supporting means, means for moving said supporting means relative to said feeding means and through an orbit extending to adjacent the binding edge, linkage means in engagement with the surface of said supporting means for actuating said feeding means in response to the motion of said supporting means, and means for urging the strip from said supporting means to the binding edge.

19. A machine for applying a strip of material to the binding edge of a book comprising means for supporting the strip, means for feeding the strip material to said supporting means, means for moving said supporting means relative to said feeding means and through an orbit extending to adjacent the binding edge, linkage means for actuating said feeding means in response to the motion of said supporting means, means for urging the strip from said supporting means to the binding edge, and means for blocking the response of said linkage means to interrupt the actuating of said feeding means.

20. The method of applying a strip of material to the binding edge of a book being conveyed adjacent thereto comprising the steps of feeding the strip material, cutting a strip from the strip material while the strip material adjacent thereto is held stationary, moving the strip relative to the strip material being fed and toward the binding edge, holding the strip by fluid pressure as it is moved toward the binding edge, moving the strip adjacent the binding edge at substantially the same speed thereof, and repelling the strip by fluid pressure toward the binding edge.

21. The process of applying a strip of material to the binding edge of a book comprising the steps of feeding the strip material, cutting a strip from the strip material held stationary adjacent thereto as the strip is moved, moving the strip along a portion of an orbital path extending toward the binding edge, holding the strip by fluid pressure as it is moved toward the binding edge, and repelling the strip by fluid pressure toward the binding edge when the strip is adjacent thereto.

22. A machine for applying strips of material to the backs of books feeding along a substantially linear path in interspaced end to end relation with their backs mutually aligned comprising a stationary frame, means mounted on said stationary frame for feeding said material in a linear path and in the form of a longitudinally moving strip having a width substantially equal to the desired lengths of said strips and moving transversely to said books' traveling path and spaced opposite to said backs, strip carrying means including a cutting edge, means for moving said carrying means relative to said feeding means and through an orbital path parallel to said books' traveling path and at a right angle to said strip with said carrying means traveling in the direction of said feeding books and opposite to their backs, said orbital path being substantially bisected by said material's linear path, and a stationary cutting edge located parallel to said orbital path for substantially right angular contact with said strip on the side thereof facing said backs as said carrying means moves towards said strip.

References Cited by the Examiner

UNITED STATES PATENTS

| | | | |
|---|---|---|---|
| 1,129,064 | 2/1915 | Bredenberg | 156—556 |
| 2,646,104 | 9/1950 | Hawkes | 156—518 |

EARL M. BERGERT, *Primary Examiner.*

W. E. HOAG, *Assistant Examiner.*

UNITED STATES PATENT OFFICE
CERTIFICATE OF CORRECTION

Patent No. 3,319,499　　　　　　　　　　　　　　　　May 16, 1967

Thomas B. Hawkes et al.

It is hereby certified that error appears in the above numbered patent requiring correction and that the said Letters Patent should read as corrected below.

Column 1, line 29, for "passes through" read -- has set --; lines 29 and 30, strike out "it remains plied" and insert instead -- such as crash is applied --; column 4, line 25, for "gevel" read -- bevel --; column 5, line 44, after "5" insert a closing parenthesis; column 6, line 4, for "whever" read -- whenever --; column 8, lines 11 and 13, for "strip", each occurrence, read -- trip --; line 51, for "surfaces" read -- surface --; column 9, line 49, before "machine" insert -- the --.

Signed and sealed this 28th day of November 1967.

(SEAL)
Attest:

EDWARD M. FLETCHER, JR.　　　　　　　　　　　EDWARD J. BRENNER
Attesting Officer　　　　　　　　　　　　　Commissioner of Patents